US009867050B1

(12) United States Patent
Kamini et al.

(10) Patent No.: US 9,867,050 B1
(45) Date of Patent: Jan. 9, 2018

(54) ULTRASONIC AUDIO TRANSMISSION OF WIRELESS LAN INFORMATION

(71) Applicant: General Motors LLC, Detroit, MI (US)

(72) Inventors: Aditya S. Kamini, Bloomfield Hills, MI (US); Hassan Elnajjar, Dearborn, MI (US); Nathaniel H. Williams, Berkley, MI (US); Marco Carnevale, Ontario (CA); Dwayne Crocker, Lake Orion, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 15/275,578

(22) Filed: Sep. 26, 2016

(51) Int. Cl.
*H04W 12/04* (2009.01)
*H04W 12/08* (2009.01)
*H04W 4/00* (2009.01)
*H04W 88/02* (2009.01)

(52) U.S. Cl.
CPC .......... *H04W 12/08* (2013.01); *H04W 4/008* (2013.01); *H04W 88/02* (2013.01)

(58) Field of Classification Search
CPC ..... H04W 12/06; H04W 12/08; H04W 4/008; H04W 4/10; H04W 4/12; H04W 12/04; H04B 10/00; H04B 10/12; H04L 63/08; H04L 67/18; H04L 63/06
See application file for complete search history.

(56) References Cited

U.S. PATENT DOCUMENTS

2015/0244472 A1* 8/2015 Poppe .................... H04B 11/00 367/135
2016/0212103 A1* 7/2016 Rhoads ................. H04W 4/008
2017/0064747 A1* 3/2017 Jung ..................... H04W 12/06

* cited by examiner

*Primary Examiner* — Thanh Le
(74) *Attorney, Agent, or Firm* — Christopher DeVries; Reising Ethington P.C.

(57) ABSTRACT

A system and method of regulating access to a short-range wireless communications network using an ultrasonic audible signal includes: receiving a handheld wireless device identifier at a short-range wireless network from a handheld wireless device that is within a communication range of the short-range wireless network; determining that the handheld wireless device is authorized to access the short-range wireless network using the handheld wireless device identifier; and broadcasting an audio signal at an ultrasonic frequency through an audio system, wherein the audio signal includes information used by the handheld wireless device for authentication to the short-range wireless communications network in response.

8 Claims, 2 Drawing Sheets

ULTRASONIC AUDIO TRANSMISSION OF WIRELESS LAN INFORMATION

TECHNICAL FIELD

The present invention relates to short-range wireless communications networks and, more particularly, to the regulation of access to these networks using ultrasonic audio signals.

BACKGROUND

Short-range wireless communications networks may be used to provide an access point that allows access to the Internet by people who carry wireless devices having short-range wireless communications functionality. These networks are becoming increasingly common as more and more people carry handheld wireless devices. To gain access to short-range wireless communications networks, a wireless device user generally visually identifies the network on a display and selects this network using a wireless device input.

Short-range wireless communications networks often control access by asking for some sort of authentication data in the form of a device identifier, a password, or both. When the wireless device initially pairs with the short-range wireless communications network, the user manually enters the authentication data into the wireless device, which then wirelessly transmits it to the network to gain access. The initial manual entry of this data can serve as an obstacle to quickly accessing short-range wireless communications networks or to switching from accessing one network to accessing a different network.

SUMMARY

According to an embodiment of the invention, there is provided a method of regulating access to a short-range wireless communications network using an ultrasonic audible signal. The method includes receiving a handheld wireless device identifier at a short-range wireless network from a handheld wireless device that is within a communication range of the short-range wireless network; determining that the handheld wireless device is authorized to access the short-range wireless network using the handheld wireless device identifier; and broadcasting an audio signal at an ultrasonic frequency through an audio system, wherein the audio signal includes information used by the handheld wireless device for authentication to the short-range wireless communications network in response.

According to another embodiment of the invention, there is provided a method of regulating access to a short-range wireless communications network using an ultrasonic audio signal. The method includes listening at a handheld wireless device for a signal broadcast via an audio system at an ultrasonic frequency; receiving information permitting access to a short-range wireless network via the signal; authenticating the handheld wireless device with the short-range wireless communications network by wirelessly transmitting at least some of the information received to the short-range wireless communications network; and accessing the short-range wireless communications network after authentication.

According to yet another embodiment of the invention, there is provided a method of regulating access to a short-range wireless communications network using an ultrasonic audio signal. The method includes wirelessly transmitting a message from a vehicle telematics unit to a central facility that includes a request to verify an association between a handheld wireless device and a vehicle; wirelessly receiving confirmation from the central facility at the vehicle telematics unit that the handheld wireless device and the vehicle are associated; broadcasting an audio signal, at an ultrasonic frequency through an audio system of the vehicle, that includes information used by the handheld wireless device to gain access to the short-range wireless communications network; and permitting access to the short-range wireless communications network provided by the vehicle after receiving at least some of the information included in the broadcast audio signal at the vehicle from the handheld wireless device.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below uses an ultrasonic audio signal (i.e., sound pressure waves) that wirelessly transmits authentication data to a wireless device. As the wireless device initially approaches a short-range wireless communications network, the wireless device can automatically transmit a wireless device identifier to a device hosting or providing the network. The hosting device can then determine whether or not the wireless device is authorized to access the network. To authorize the wireless device, the hosting device can send a message that includes the wireless device identifier to a central facility with a request to verify that access should be granted. Assuming the central facility confirms that the wireless device is authorized, the hosting device can then generate an audio signal at ultrasonic frequencies that includes authentication data, such as a network identifier, a password, or both, using an audio system. The wireless device can listen for and receive this signal. After receiving the signal, the wireless device extracts the authentication data from the signal and then accesses the short-range wireless communications network using the authentication data. The receipt of the ultrasonic audible signal including authentication data can eliminate the initial manual entry of authentication data at the wireless device for gaining access to the short-range wireless communication network.

The embodiments described below will be explained in terms of a vehicle and its vehicle telematics unit acting as the hosting device that provides the short-range wireless communications network to nearby wireless devices and a vehicle audio system to broadcast the signal at ultrasonic frequencies. However, it should be appreciated that implementations of hosting devices other than those using a vehicle telematics unit are possible. For example, the hosting device could be implemented as a fixed wireless modem that is linked to an audio system capable of generating ultrasonic audible signals.

Communications System—

Figure 1:
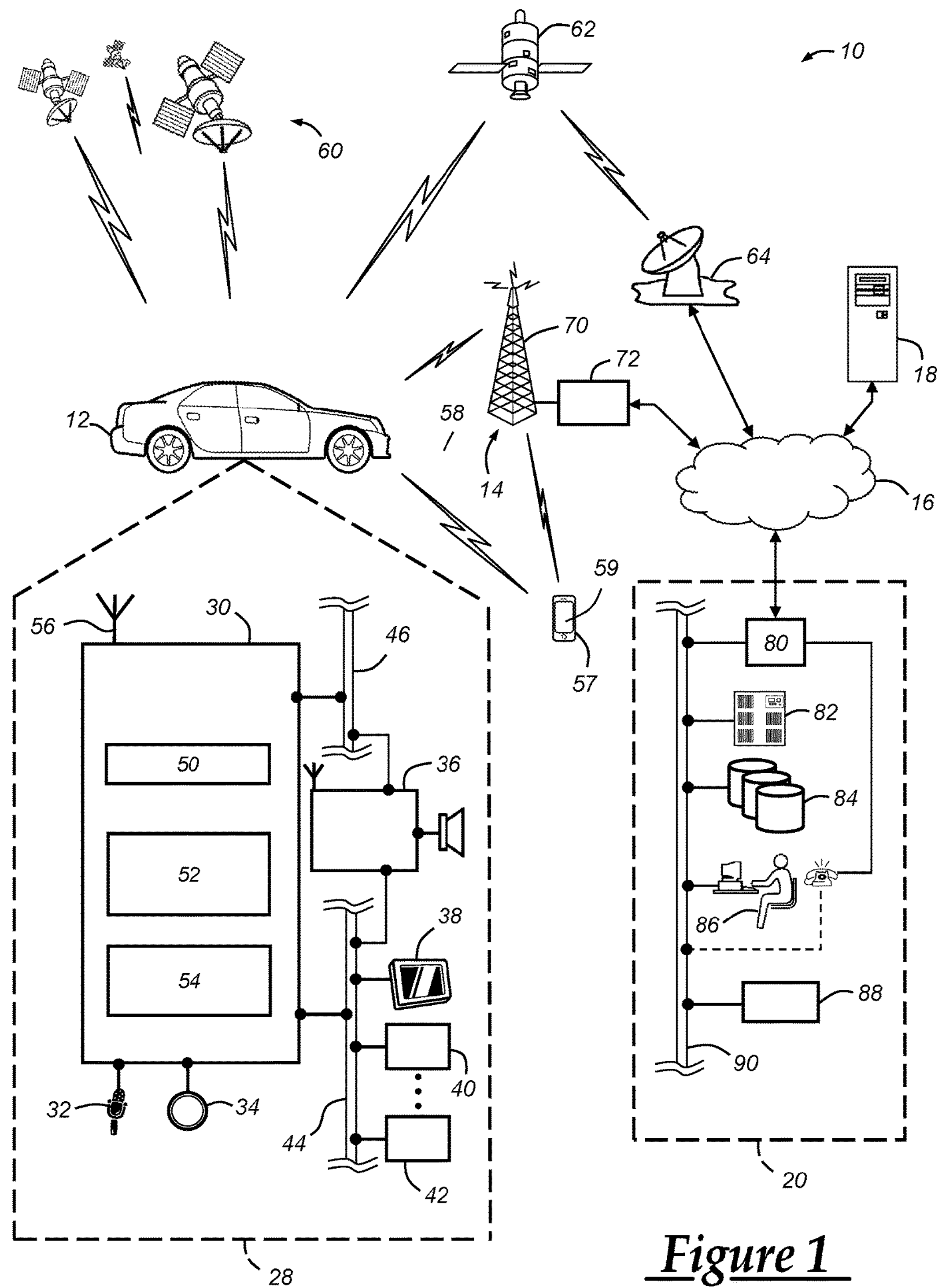
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 uses cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE.

Wireless networking between the vehicle and other networked devices can also be carried out using telematics unit 30 to implement a short-range wireless communications network. For this purpose, telematics unit 30 can be configured to communicate wirelessly according to one or more wireless protocols, including short range wireless communication (SRWC) such as any of the IEEE 802.11 protocols, WiMAX, ZigBee™ Wi-Fi direct, Bluetooth, or near field communication (NFC). As is known by those skilled in the art, the vehicle telematics unit 30 can be configured to provide the short-range wireless communications network using a Wireless Local Area Network (WLAN) Wireless Personal Area Network (WPAN) through which networked wireless devices can communicate using the wireless protocols. The WLAN can be referred to as a wireless or Wi-Fi hotspot or could involve a short-range wireless communication link between the vehicle 12 and one or more networked devices using the Bluetooth wireless protocol to communicate with the vehicle 12. The WLAN can broadcast a service set identifier (SSID) that identifies the WLAN to networked devices. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a handheld wireless device, such as a smart phone 57. The smart phone 57 can include computer processing capability, a transceiver capable of communicating using a short-range wireless protocol, and a visual smart phone display 59. In some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple and the Galaxy™ manufactured by Samsung as well as others. While the smart phone 57 may include the ability to communicate via cellular communications using the wireless carrier system 14, this is not always the case. For instance, Apple manufactures devices such as the various models of the iPad™ and iPod Touch™ that include the processing capability, the display 59, and the ability to communicate over a short-range wireless communication link. However, the iPod Touch™ and some iPads™ do not have cellular communication capabilities. Even so, these and other similar devices may be used or considered a type of wireless device, such as the smart phone 57, for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module included in the audio system 36 and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20.

Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. The audio system 36 can include an infotainment module configured to communicate via wired and wireless techniques independent of the communications functionality provided by the telematics unit 30. For example, the wireless networking between the vehicle 12 and the other networked devices discussed above can also be carried out by the infotainment module of the audio system 36. The infotainment module can include a dedicated antenna capable of communicating via short-range wireless communications protocols and establish wireless communications links with handheld wireless devices, such as smart phone 57, as well as Wi-Fi hotspots. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
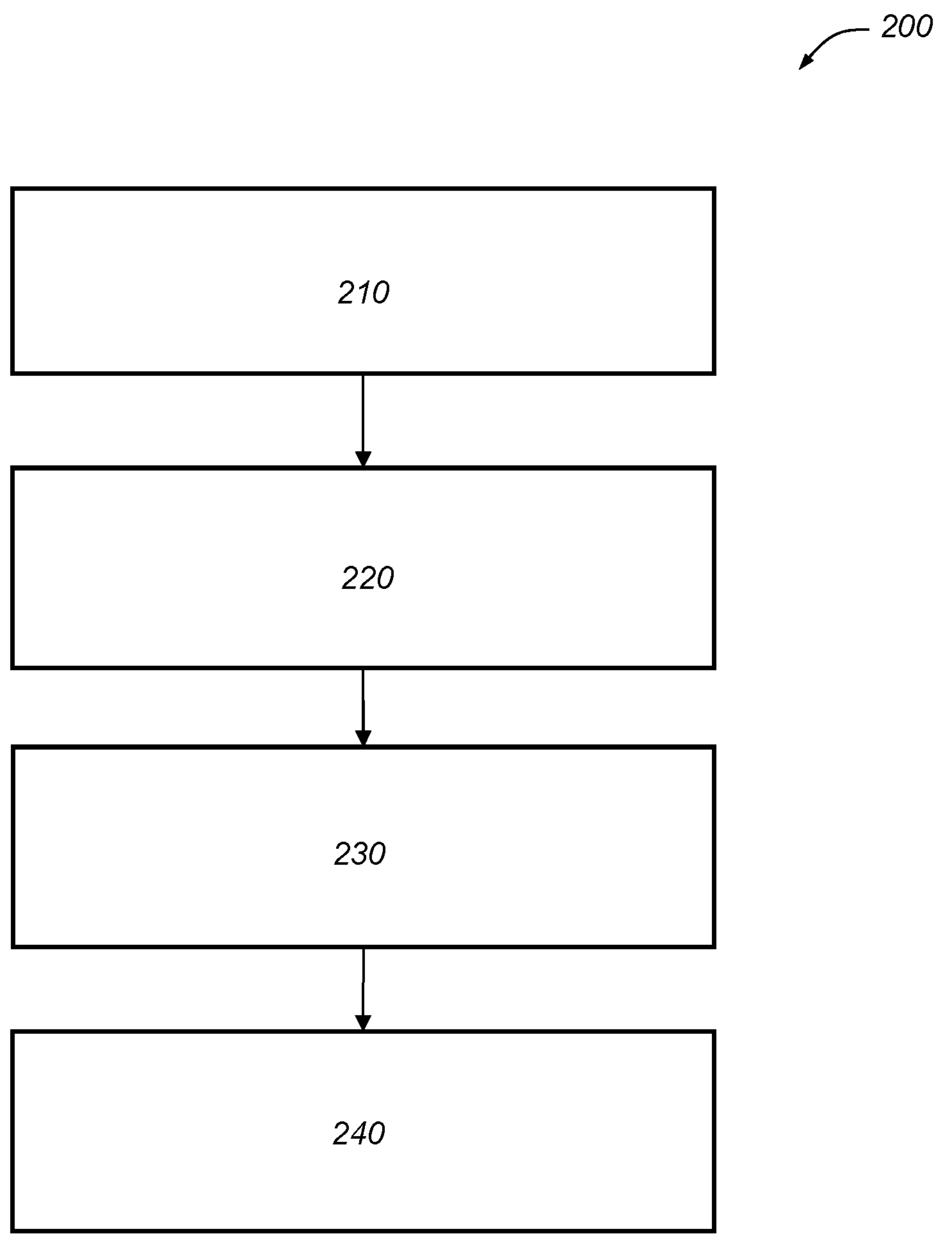
FIG. 2 is a flow chart depicting an embodiment of a method of authorizing access to a short-range wireless communications network in accordance with an embodiment of the invention.

Turning now to FIG. 2, there is shown a method (200) of authorizing access to a short-range wireless communications network using an ultrasonic audio signal. The method 200 begins at step 210 by transmitting a handheld wireless device identifier from the smart phone 57 to the short-range wireless network to determine whether the smart phone 57 is authorized to access the short-range wireless network. As the smart phone 57 nears the vehicle 12, the smart phone 57 can be placed in a condition in which it detects the presence of one or more short-range wireless communications networks and in response initiates communications with the network. In this implementation, the vehicle telematics unit 30 can provide the short-range wireless communications network and broadcast an SSID via its antenna 56. As part of initiating communications, the smart phone 57 can be placed or exist in a discovery mode during which time the smart phone 57 can broadcast its SSID or other handheld wireless device identifier. The vehicle telematics unit 30 can receive this broadcast and use the handheld wireless device identifier it receives to determine whether or not the smart phone 57 is authorized to access the short-range wireless communications network.

The smart phone 57 can be configured to selectively transmit the handheld wireless identifier. For example, the smart phone 57 can wirelessly receive the location of the vehicle 12 from a central facility, such as the computer 18 or the call center 20, and establish a geofence around the vehicle location. The smart phone 57 can periodically or continuously determine its location and when it enters the geofence surrounding the vehicle location, the smart phone 57 can begin to transmit its handheld wireless identifier via a short-range wireless protocol. The method 200 proceeds to step 220.

At step 220, a message is wirelessly transmitted from the vehicle telematics unit 30 to a central facility that includes a request to verify an association between the smart phone 57 and the vehicle 12. Before the vehicle telematics unit 30 broadcasts authentication data via an audio signal, the unit 30 can first determine whether the smart phone 57 is authenticated to access the short-range wireless communications network. In one implementation, an association between the smart phone 57 and the vehicle 12 can be established at a central facility, such as the computer 18 or call center 20. The central facility can maintain accounts identified by vehicle owners. These accounts can each identify one or more vehicles that are owned or regularly used by the vehicle owner associated with the account as well as the handheld wireless device(s) that the vehicle owner uses or permits to access to the short-range wireless networks generated by the vehicles. When the central facility receives a message including a handheld wireless device identifier from the vehicle 12 that requests verification of the smart phone 57, the central facility can search its database containing the accounts to determine whether or not the smart phone 57 identified by the handheld wireless device identifier is found and permitted to access the vehicle 12 sending the identifier.

If the central facility identifies the handheld wireless device identifier in an account, the central facility can then determine whether the vehicle 12 associated with the vehicle telematics unit 30 sending the request permits the smart phone 57 to access its short-range wireless communications network. The central facility can accomplish this by comparing the mobile number the vehicle telematics unit 30 used to send the request message or a vehicle identifier, such as a VIN, with the mobile numbers/VINs in the account associated with the smart phone 57. When the central facility determines that the smart phone 57 is permitted to access the short-range wireless communications network, the central facility can wirelessly transmit confirmation of this determination to the vehicle telematics unit 30 via the wireless carrier system 14. Confirmation is wirelessly received at the vehicle 12 that the smart phone 57 and the vehicle 12 are associated. If the smart phone 57 is determined not to have permission to access the short-range wireless communications network, the central facility can generate and send a message communicating this determination to the vehicle telematics unit 30 or alternatively simply not respond to the request message sent by the vehicle telematics unit 30. The method 200 proceeds to step 230.

At step 230, an audio signal is broadcast that includes information used by the smart phone 57 to gain access to the short-range wireless communications network at an ultrasonic frequency through the audio system 36. After the vehicle telematics unit 30 has confirmed that the smart phone 57 is authorized to access the short-range wireless communications network, the unit 30 can access the authentication data needed to access the network and then audibly broadcast using one or more speakers of the audio system 36. The authentication data included in the audible broadcast may vary depending on the short-range communication protocols used by the short-range wireless communications network. In one implementation involving Bluetooth pairing, the audible broadcast can include the Bluetooth name of the vehicle telematics unit 30 and a link key that acts as a shared secret and may be used by both the smart phone 57 and the vehicle telematics unit 30 to pair the devices. However, it should be appreciated that the authentication data can include different content.

The authentication data can be broadcast at an ultrasonic frequency. The human ear can hear sounds in the range of approximately 20 Hz to 20 kHz. Any frequencies above and below this range may be imperceptible to the ear. Consumer audio equipment including speakers, microphones and amplifiers included in the audio system 36 are designed to work in this frequency range. Handheld wireless devices, such as the smart phone 57, can theoretically record and reproduce sounds with a peak frequency as high as 22,050 Hz. This limit is related to the maximum possible output sample rate of these devices, which is equal to 44,100 Hz. Frequency response of microphones and speakers of the smart phone 57 have a noticeable roll-off above 19 kHz; the same applies to the microphone 32 and the audio system 36. Generally speaking, the signal can be broadcast at ultrasonic frequencies that range between 16.5-17 kHz to 18.5-19 kHz at which frequencies the signals can be cleanly reproduced and captured by most handheld wireless devices yet are barely perceptible to the human ear.

In one implementation, the authentication data can be superimposed on a carrier signal audibly broadcast at a frequency between 17-18.5 kHz. Frequency modulation for achieving data transfer and the frequency of the carrier signal can be modulated by a digital binary signal, where logical 0 and logical 1 correspond to 17 kHz and 18 kHz, respectively. A frequency sweep from 17.1 kHz to 17.5 kHz may be used to transmit logical 0s and a frequency sweep from 18.1 kHz to 18.5 kHz may be used to transmit logical 1s. Such an approach can compensate for a deep fade effect that might affect a frequency within a certain range whereby sending over multiple frequencies within each range can ensure that the data can be reconstructed from frequencies that are not affected by the effect. The smart phone 57 is generally located close enough to the audio system 36 that it can receive the broadcast signal via its microphone, demodulate the broadcast signal, and read the authentication data. The method 200 proceeds to step 240.

At step 240, access is permitted to the short-range wireless communications network after receiving at least some of the content of the authentication data from the smart phone 57. Once the smart phone 57 has read the authentication data, the contents of that data can be wirelessly transmitted to the vehicle telematics unit 30 via short-range wireless protocols. The vehicle telematics unit 30 can establish short-range wireless communications with the smart phone 57 when the authentication data it provides matches what the vehicle telematics unit 30 audibly broadcast. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the above-described use of ultrasonic sound pressure waves to authorize access to a network may be implemented using other encoding approaches than the frequency-based coding scheme described above; for example, by amplitude-shift keying or other modulation techniques known to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of regulating access to a vehicle short-range wireless communications network using an ultrasonic audio signal, comprising the steps of:

(a) receiving a handheld wireless device identifier at a short-range wireless network provided by a vehicle, wherein the handheld wireless device identifier is received from a handheld wireless device that is within a communication range of the vehicle's short-range wireless network;

(b) wirelessly transmitting a message from a vehicle telematics unit on the vehicle to a central facility, wherein the message includes the handheld wireless device identifier and a request to verify that the handheld wireless device is authorized to access the vehicle's short-range wireless network;

(c) wirelessly receiving confirmation from the central facility at the vehicle telematics unit that the handheld wireless device is authorized to access the vehicle's short-range wireless network;

(d) determining from the confirmation that the handheld wireless device is authorized to access the vehicle's short-range wireless network;

(e) in response to the determination, broadcasting an audio signal at an ultrasonic frequency through an audio system of the vehicle, wherein the audio signal includes information used by the handheld wireless device to gain access to the vehicle's short-range wireless communications network; and (f) permitting the handheld wireless device to access the vehicle's short-range wireless communications network after receiving at least some of the information included in the broadcast audio signal at the vehicle from the handheld wireless device.

2. The method of claim 1, wherein the handheld wireless device comprises a smart phone.

3. The method of claim 1, further comprising the step of determining that the handheld wireless device is within a geofence surrounding the vehicle.

4. The method of claim 1, wherein the ultrasonic frequency comprises a frequency within the range of 16.5-19 kHz.

5. The method of claim 1, further comprising the step of comparing a received handheld wireless device identifier with a plurality of accounts belonging to vehicle owners.

6. A method of regulating access to a vehicle short-range wireless communications network using an ultrasonic audio signal, comprising the steps of:

(a) determining that a handheld wireless device is within a geofence surrounding a vehicle;

(b) receiving from the handheld wireless device a handheld wireless device identifier at a short-range wireless network provided by the vehicle;

(c) wirelessly transmitting a message from a vehicle telematics unit to a central facility that includes the handheld wireless device identifier and a request to verify that the handheld wireless device is authorized to access a short-range wireless communications network provided by the vehicle;

(d) wirelessly receiving confirmation from the central facility at the vehicle telematics unit that the handheld wireless device is authorized to access the short-range wireless network;

(e) broadcasting an audio signal, at an ultrasonic frequency through an audio system of the vehicle, that includes information used by the handheld wireless device to gain access to the short-range wireless communications network, wherein the information includes a network identifier for use by the handheld wireless device in accessing the short-range wireless network; and (f) permitting access to the short-range wireless communications network provided by the vehicle after receiving at least some of the information included in the broadcast audio signal at the vehicle from the handheld wireless device;

wherein the network identifier is a service set identifier (SSID) or a Bluetooth device name.

7. The method of claim 6, wherein the ultrasonic frequency comprises a frequency within the range of 16.5-19 kHz.

8. The method of claim 6, further comprising the step of comparing a received handheld wireless device identifier with a plurality of accounts belonging to vehicle owners.

* * * * *